Patented Apr. 21, 1931

1,801,478

UNITED STATES PATENT OFFICE

FRANCIS C. ATWOOD, OF NEWTONVILLE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE

METHOD OF HARDENING GELATIN FILMS AND RESULTING PRODUCT

No Drawing.   Application filed April 22, 1927.   Serial No. 185,915.

This invention relates to a method of effecting the so-called "hardening" of colloidal substances such as gelatin films or gelatin coatings commonly employed in photography and the related arts, and to the resulting product.

It is an object of the invention to provide a method of effecting the hardening of gelatin (particularly in its solidified or substantially dry condition) which shall be simple to carry into practice on a commercial scale, with economy of labor and material, and which shall accomplish the production of a hardened gelatin film or surface of improved characteristics, more especially with respect to its capacity for the imbibition of liquids, such as dye solution.

Briefly stated, the method of the invention includes subjecting a sheet of gelatin, containing a suitable hardening agent such as an alkali bichromate, to contact with a reducing gas, preferably under regulated conditions of concentration, heat, moisture, and time, adapted to effect the desired hardening action upon the gelatin.

Alternatively, the treatment may also be effectively accomplished when applied to the gelatin coatings on films and the like, by subjecting the cellulosic film backing or the intermediate subtratum to the gaseous treatment described and thereafter applying the gelatin coating to the treated backing followed by providing suitable conditions to cause the gaseous reagent to permeate the gelatin coating and to induce the hardening of the gelatin layer.

The hardening agent may also be incorporated with the gelatin substance by dissolving in the emulsion from which the gelatin film is prepared or by subsequently impregnating the solidified film with a solution containing it.

The term "reducing gas" is herein employed to include any substance which manifests the property of reducing the bichromate hardening agent to its condition or state of activity with respect to the hardening reaction of the gelatin and which is susceptible of vaporization, at temperatures appropriate for use with the gelatinous material to be treated, either per se or in conjunction with other gases or vapors, such as the atmosphere.

A specific application of the invention will be described in its relation to the treatment of gelatin blanks which are intended for use in the preparation of cinematographic films or the like by the imbibition methods of printing.

To this end, the gelatin may be first prepared in the form of an aqueous emulsion or solution, according to any of the usual or known procedures, and an alkali bichromate including ammonium bichromate (e. g. 5% potassium bichromate) is dissolved therein. The resulting emulsion or solution is then extended into the form of a film or as a surface coating upon a cellulosic film or other appropriate backing material. The film or coating is then permitted or caused to solidify by any convenient and appropriate mode of treatment, completely or to such extent as may be found preferable, in view of the subsequent steps to be performed.

The solidified gelatin coating or film, as thus prepared is then subjected to uniform and intimate contact with the reducing gas, such as sulphur dioxide or a mixture of sulphur dioxide and air, as by passing the strip continuously through a chamber filled with the gas or gaseous mixture. The degree of treatment to be effected may be controlled by regulating the period of contact (as for example by adjusting the size of the chamber and speed of film) and also by suitably conditioning the composition, concentration and temperature of the gaseous atmosphere. The result may be further modified by the conditions of the film surface as it is subjected to the gas treatment, as for example the degree of solidification of the gelatin, the adsorbed moisture, temperature of the film, etc.

As indicated above, an alternative procedure may be adopted in which the sulphur dioxide treatment may be applied to the cellulosic backing or to the intermediate substratum of the film. The coating of gelatin emulsion or solution (containing the hardening agent therein) may then be applied to the gas treated surface of the backing or substratum and solidified in situ. Thereafter, the gas may be caused to activate the hardening agent, as by application of ultra-violet light or heat (e. g. 80°–120° F.), thereby causing the gelatin to harden. The time required for hardening will be shortened by increase of temperature, increased amount of moisture and decrease of thickness of the gelatin film.

As prepared in either of the ways set forth or by other modifications thereof or equivalent procedure, the resulting films are characterized by possessing a uniformly developed "hardened" structure with respect to different areas of the film surface and substantially so with respect to the successive depths through the thickness of the film. In the alternative procedure of first treating the backing and subsequently applying the gelatin coating, the portions of the latter contiguous with the treated backing are hardened more than the exterior portions, which for some purposes is preferable.

According to this invention the degree of development of such hardening action is susceptible of relatively accurate control to a predetermined value or condition and also permits of accurate duplication within the limits of the properties manifested by the original gelatin of the emulsion. It may also be positively limited by the amount of the bichromate hardening agent incorporated into the gelatin film structure.

An outstanding advantage secured by the invention is that it renders the treatment or hardening of gelatin applicable to gelatin films or gelatin surfaces in a solidified and relatively dry state and without the presence or addition of appreciable amounts of free liquids thereon. It also results in the obtainment of a uniform product of readily controlled characteristics which is admirably adapted for the reception of color images to be transferred thereto by imbibition contact printing.

I claim:

1. A method of hardening gelatin films and the like, which comprises incorporating therein an appropriate gelatin hardening reagent containing an alkali bichromate and subjecting the film to contact with a reducing gas characterized by activating the hardening action of the reagent.

2. A method of hardening gelatin films, which comprises incorporating therein an alkali bichromate and subjecting the film to contact with sulphur dioxide.

3. A method of hardening gelatin films, which comprises incorporating an alkali bichromate hardening agent therein, drying, and contacting the same with a reducing gas characterized by activating the hardening action of the bichromate.

4. A method of hardening gelatin films which comprises incorporating a hardening agent such as an alkali bichromate therein, drying and contacting with a gas containing sulphur dioxide.

5. A method of hardening gelatin films, which comprises subjecting a cellulosic backing to contact with a reducing gas, thereafter superposing a gelatin coating containing an alkali bichromate hardening agent upon said film, and finally causing the adsorbed gas to activate the hardening agent by the application of heat.

6. A film comprising a backing carrying an adsorbed layer of a reducing gas, and a gelatin surface coating containing an alkali bichromate hardening agent.

7. A film comprising a backing carrying an adsorbed layer of a reducing gas and a gelatin surface coating containing an alkali bichromate hardening agent in quantity proportionate to the degree of hardness required.

8. A film comprising a backing, a substratum impregnated with a reducing gas, and a gelatin surface containing an alkali bichromate hardening agent.

9. A method of hardening gelatin films which comprises incorporating therewith a bichromate hardening agent, drying, and treating the same with a mixture of sulphur dioxide gas and air at an elevated temperature of approximately 80°–120° F.

10. A method of hardening gelatin films which comprises treating a backing material with sulphur dioxide, applying a gelatinous coating containing a bichromate hardening agent, drying, and subsequently activating said hardening agent by subjecting to an elevated temperature.

11. A method of hardening gelatin films which comprises treating a backing material with sulphur dioxide, applying a gelatinous coating containing a bichromate hardening agent and subjecting to a temperature of 80°–120° F.

12. A film comprising a backing impregnated with a reducing gas, a gelatin coating containing a hardening agent, the portion of said gelatin coating contiguous with the backing being hardened.

13. A film comprising a backing impregnated with sulphur dioxide, a gelatin coating containing a bichromate gelatin hardening agent, the portion of said gelatin coating contiguous with the backing being hardened.

Signed by me at Boston, Massachusetts, this 29th day of March 1927.

FRANCIS C. ATWOOD.